United States Patent [19]

Kim

[11] Patent Number: 5,475,600
[45] Date of Patent: Dec. 12, 1995

[54] MOBILE ROBOT WHICH UTILIZES INERTIAL NAVIGATION TO CALCULATE SHORTEST RETURN DISTANCE

[75] Inventor: Tae-Sik Kim, Suwon, Rep. of Korea

[73] Assignee: Samsung Electronics Co., Ltd., Kyungki, Rep. of Korea

[21] Appl. No.: 1,530

[22] Filed: Jan. 6, 1993

[30] Foreign Application Priority Data

Jan. 6, 1992 [KR] Rep. of Korea ............................. 92-33

[51] Int. Cl.$^6$ .................................................. G06F 165/00
[52] U.S. Cl. ..................... 364/453; 364/424.02; 364/444; 356/139.07
[58] Field of Search ..................................... 364/444, 449, 364/450, 453, 457, 460, 447, 424.02, 424.01, 559; 318/587; 180/167, 169; 901/1, 47; 356/139.07, 139.08

[56] References Cited

U.S. PATENT DOCUMENTS

| | | | |
|---|---|---|---|
| 4,556,940 | 12/1985 | Katoo et al. | 364/424.02 |
| 4,638,445 | 1/1987 | Mattaboni | 364/424.01 |
| 4,817,000 | 3/1989 | Eberhardt | 364/443 |
| 4,937,945 | 7/1990 | Schofield et al. | 33/356 |
| 4,939,650 | 7/1990 | Nishikawa | 364/424.02 |
| 4,991,126 | 2/1991 | Reiter | 364/561 |
| 5,042,157 | 8/1991 | Garrett et al. | 33/363 K |
| 5,233,526 | 8/1993 | Detriche et al. | 364/424.02 |

*Primary Examiner*—Michael Zanelli
*Attorney, Agent, or Firm*—Sughrue, Mion, Zinn, Macpeak & Seas

[57] ABSTRACT

A mobile robot with a navigation system using inertia includes a cylindrical reflecting plate disposed on the periphery of a compass for indicating a fixed direction regardless of the flow of the robot. A microcomputer determines the difference between the waveforms sensed by an optical sensor displaced on the compass and compensates precisely the moving path of the robot. The robot can be returned along the shortest return distance obtained in a vector, thereby greatly increasing the efficiency of the robot.

9 Claims, 8 Drawing Sheets

MOBILE ROBOT WHICH UTILIZES INERTIAL NAVIGATION TO CALCULATE SHORTEST RETURN DISTANCE

FIELD OF THE INVENTION

The present invention relates to a mobile robot with a navigation system utilizing inertia. The present application is based on the disclosure of Korean Patent Application No. 92-33 filed Jan. 6, 1992, which disclosure is incorporated herein by reference.

BACKGROUND OF THE INVENTION

A general mobile robot employs a step motor for moving to a desired destination. In order to reach one point and then move toward another point, such a general mobile robot is turned to a desired direction by controlling the rotation number of the motor and is then moved by a predetermined distance by a driving motor controlled by a microcomputer.

Alternatively, in order to return to an original position (i.e., a started position), the robot must be moved from the reached position toward the original position by using the rotated numbers of the step motor and the driving motor, the rotated numbers being stored within a memory means in the microcomputer at the time of the initial movement.

In such a method for moving the robot as described above, however, when the robot is moved from one point toward another point, a moving course is determined based on the rotated numbers of the step motor and the drive motor. This prevents a determination of a relative moving vector between the initially started position and the presently reached position. For this reason, when the robot is returned to the originally started position after the robot has been moved to any point, the robot must be repeatedly moved back along the course previously moved. Therefore, the conventional mobile robot has a problem in that the robot cannot be returned along the shortest distance. Also, the moving direction of the robot is only determined based on the rotated numbers of the step and drive motors, so that if the rotated numbers of the robot are changed due to, for example, the friction resistance of a drive mechanism or an obstacle, etc., and the robot is deviated from a desired moving course, this state cannot be determined, whereby the deviated value from a normal moving course cannot be readily corrected.

In addition, in the mobile robot, the step motor is used as a means for precisely determining the direction and for controlling the distance, thereby causing a problem in that the manufacturing cost is increased.

A concrete example of a conventional mobile robot is disclosed in U.S. Pat. No. 4,638,445. This conventional robot is shown in FIG. 1 and includes a vision system 31; a memory means for storing data entered from the vision system 31; and a computer for processing data entered from the vision system 31 of the robot. The robot includes a first transducer array 34 which is symmetrically disposed with an axis of symmetry of the mobile robot 30 for obtaining data relative to the position and the distance of an object in a workspace; a second transducer array 35 which is symmetrically disposed with the axis of the robot 30 but along a different angle relative to the first transducer array for obtaining data relative to the position and the distance of an adjacent object in the workspace; means for sequentially transmitting signals determined by the computer 33 to each of the transducers; and, at least one auxiliary range transducer 36 for obtaining the position and distance information of the object deviated from the visual ranges of the first and second transducer arrays 34 and 35.

With this construction of the robot, there is an advantage that all of the obstacles encountered in the work space can be precisely and effectively measured since the rotation of the robot is controlled using data information processed through software built in the microcomputer. However, the plurality of transducers of which the sensing areas are different from each other are disposed in two columns over the whole periphery on the top of the mobile robot where the auxiliary range transducer is also disposed, thereby causing a complicated construction and a high manufacturing cost. Furthermore, the software built in the computer which determines the moved distance and the rotative state is complicated because of the plurality of transducers. If an erroneous operation occurs, the robot will deviate, thereby making it is impossible to protect the device from damage and to prevent such an accident.

SUMMARY OF THE INVENTION

Accordingly, the present invention has been developed in consideration of the above problems.

It is an object of the invention to provide a mobile robot with a navigation system in which an optical sensor is attached on a compass utilizing inertia and forms a separated system for indicating a fixed direction and sensing a light regardless of the positional change of the robot so that when the robot is turned in direction and the robot is deviated from a normal orbit, the changed angle in direction can be discriminated based on the amount of movement caused by the movement of a cylindrical light-reflecting plate which surrounds the periphery of the compass.

Another object of the present invention is to provide a mobile robot with a navigation system utilizing inertia which can determine whether or not the robot is turned in the right or in the left by using waveforms of the light reflected from the reflecting plate.

Still another object of the present invention is to provide a mobile robot with a navigation system utilizing inertia in which a magnetic sensor is mounted on a general motor so that the drive and the directional change of the robot may be easily performed.

To achieve the above objects, the present invention provides a mobile robot with a navigation system utilizing inertia which comprises an inertial navigation means for providing information for recognizing the directional angle to be changed when the robot is moved to a predetermined position by detecting the moved angle of the robot as the relative vector of the initial start and providing information for compensating the angle deviated due to an obstacle or the like on the moving course of the robot; means for measuring the moved distance of the robot; means for perpendicularly turning the robot's direction after it has been moved by a predetermined distance; and means for controlling the direction turn means, by precisely determining the moved angle of the robot on the basis of the information from the inertial navigation means and calculating the shortest return distance so as to allow the robot to be returned along the shortest distance.

DESCRIPTION OF THE PREFERRED EMBODIMENTS

An embodiment of the present invention will now be described by way of example with reference to FIGS. 2 through 9.

Figure 1:
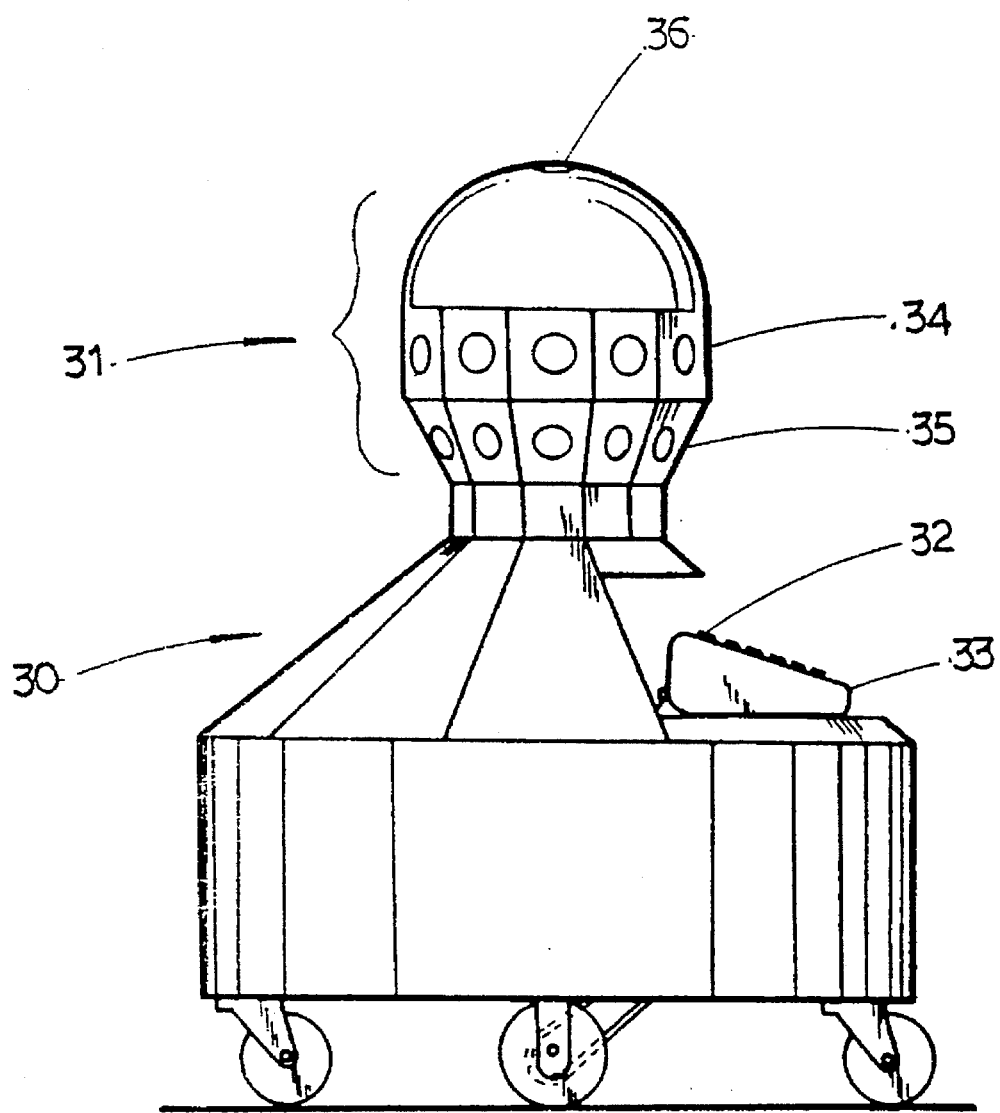
FIG. 1 is a front view schematically showing a conventional autonomous mobile robot system.
Figure 2:
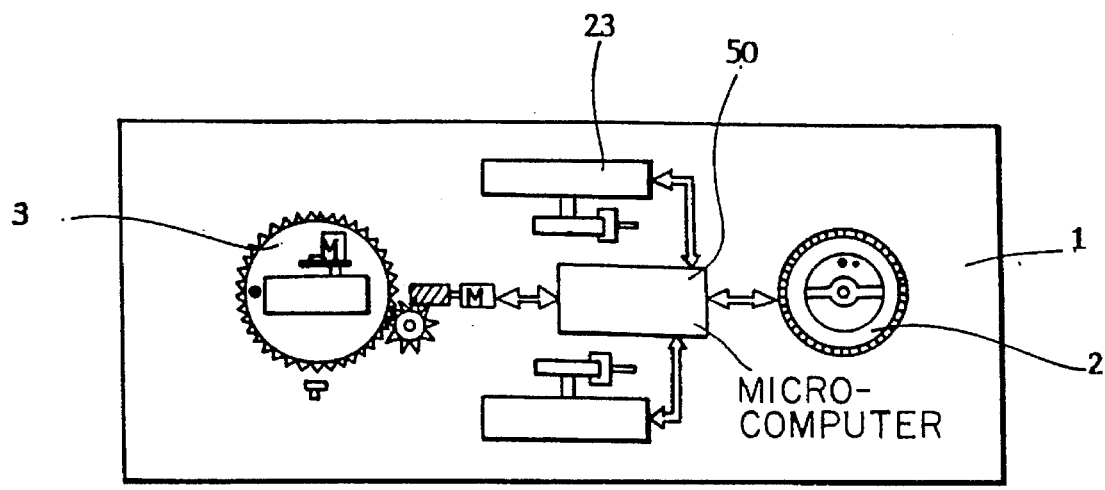
FIG. 2 is a plan view schematically showing a mobile robot system of the present invention.
Figure 3:
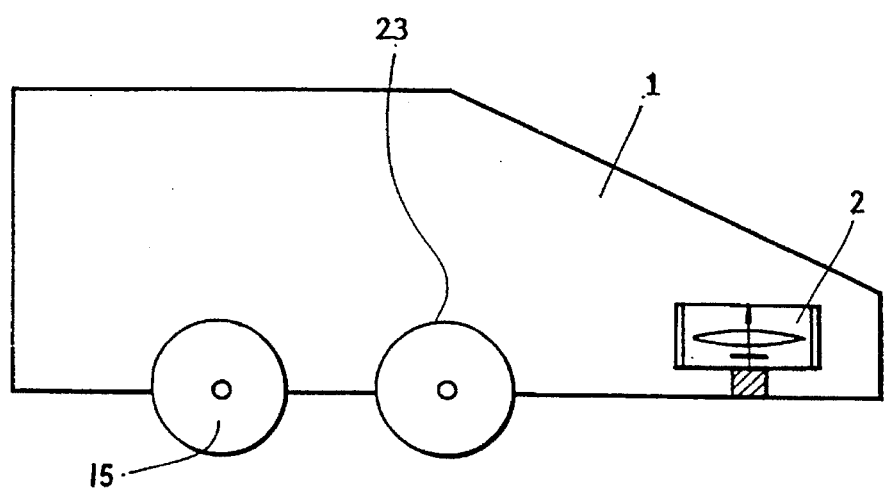
FIG. 3 is a schematic side view of FIG. 2.
Figure 4:
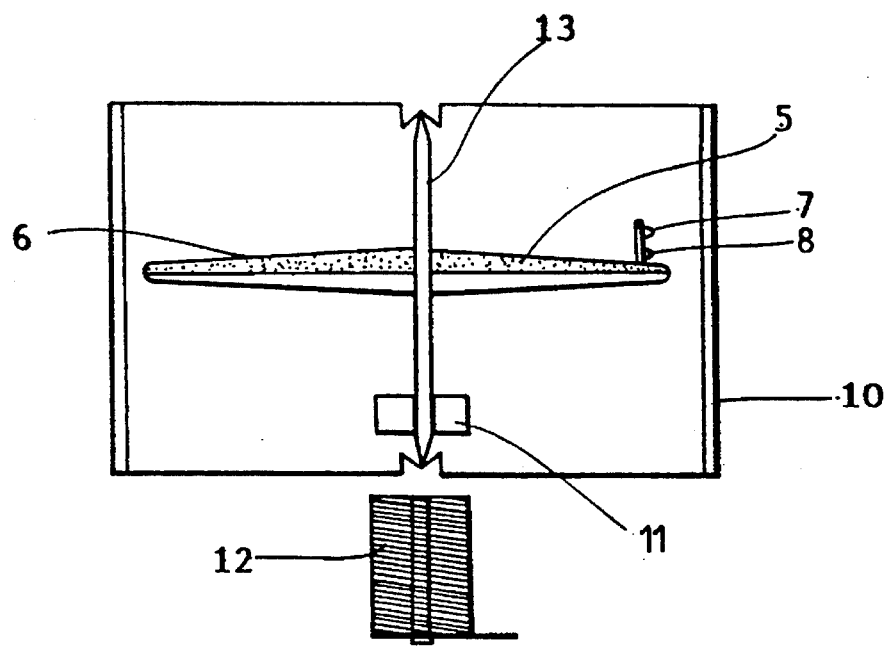
FIGS. 4(a) and (b) are views showing a construction of a navigation system.
Figure 4:
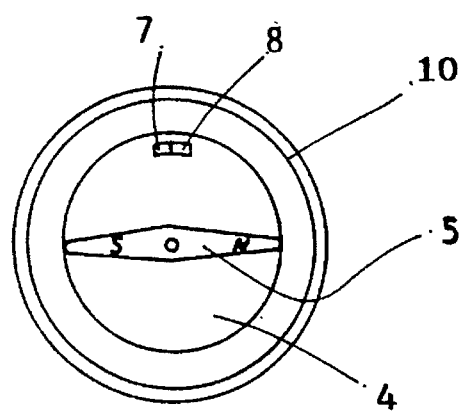

FIG. 2 is a plan view schematically showing a mobile robot system of the present invention and FIG. 3 is a side view of FIG. 2.

In FIGS. 2 and 3, numerical reference number 1 is a body of the mobile robot, 2 is an inertial navigation system which precisely controls the moving angle of the robot, which recognizes the directional angle to be deviated during movement of the robot toward a predetermined position as the relative vector at the time of the initial start and which senses the movement of the robot so as to compensate for the angle deviated due to an obstacle and the like on a surface of the moving path at all times, 3 is a driving means, that is, a driving device which allows the robot 1 to be precisely turned in a direction by an angle of 90° under the operation of a direction control motor which will be described later and which allows the robot to be also be advanced along the moving path, 23 is a measure means, that is, a powerless wheel which is cooperated with the driving means 3 and measures the moved distance, and 50 is a microcomputer, that is, a control means for controlling the whole operation of the system, the control means being connected through wires to the navigation system 2, the driving means 3 and the powerless wheel 23 and allowing data to be entered therefrom.

FIGS. 4(a) and (b) show a structural view of the navigation system. Specifically, FIG. 4(a) shows the structural relation between a first permanent magnet 5 and a magnetic coil 12, and FIG. 4(b) shows in more detail the first permanent magnet 5 on a cylindrical plate 4. As seen from the drawings, on the cylindrical plate 4 is mounted the first permanent magnet 5 having the N-pole and the S-poles at its ends to thereby form the compass 6. On the upper side of the compass 6 is mounted a first light generating device 7 for generating a light and a first optical sensor 8 for sensing reflected light which is emitted and then reflected back from the first light generating device 7.

In addition, when the frictional force is produced between the compass 6 and the bottom of the navigation system 2 because of the weight of the compass 6, the force acts so as to disturb the accuracy of the compass for indicating the moved position of the robot.

To remove such a problem, a second permanent magnet 11 is mounted on the bottom of the compass 6, the second permanent magnet having the ends which are polarized into N-pole and the S-pole. Also, the magnetic coil 12 is mounted on the bottom of the second permanent magnet 11, the magnetic coil 12 having the same polarity as the second permanent magnet 11.

With this structure, if the magnetic coil 12 is magnetized as the power supply voltage is supplied and the robot is operated, the second permanent magnet 11 having the same polarity as that of the coil 12 will be pushed up by repulsion of the same polarity, so that the whole compass 6 is supported by the supporting shaft 13, which is located in the air above a fixed position by the magnetic force. This allows the moving direction of the robot to be indicated. Moreover, the cylindrical reflecting plate 10 is provided on the cylindrical periphery of the compass 6 so that the compass can indicate a fixed direction regardless of the movement of the robot. The plate 10 is moved at an angle that corresponds to the flow angle according to the movement of the robot 1. Accordingly, if the light is emitted from the light generating device 7 disposed on the compass 6, various waveforms in the reflected light are sensed by the first optical sensor 8. That is, various waveforms in the reflected light sensed as described above are analyzed by the microcomputer 50 to determine whether or not the robot has correctly moved on the moving path.

Figure 5A:
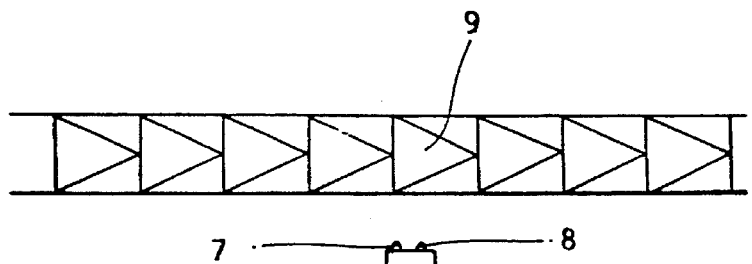
FIGS. 5(a) to (d) are views illustrating the rotative direction and the measurement of the angle in a navigation system.
Figure 5B:
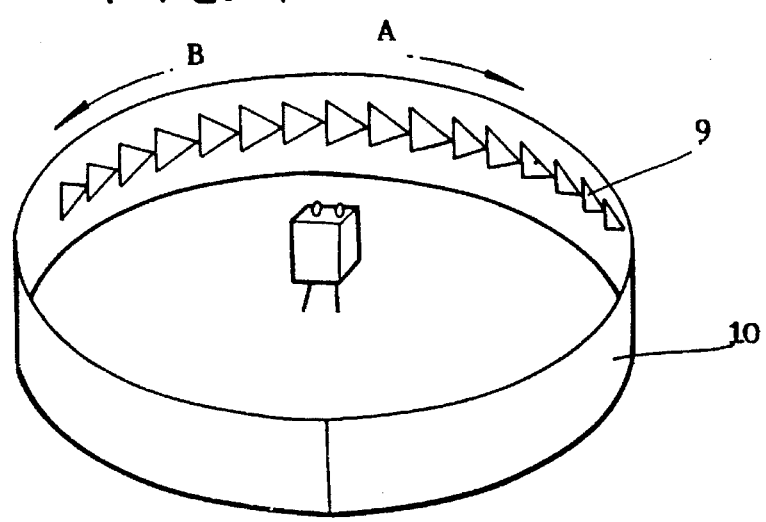
Figure 5C:
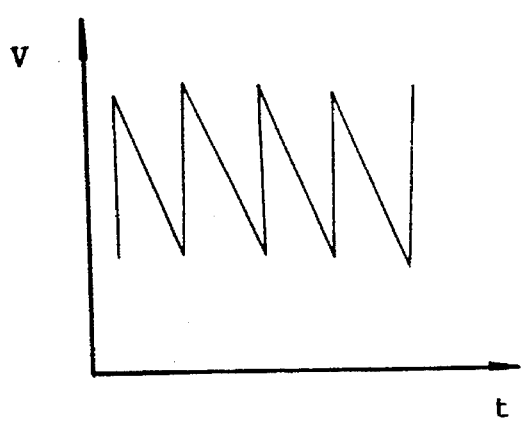
Figure 5D:
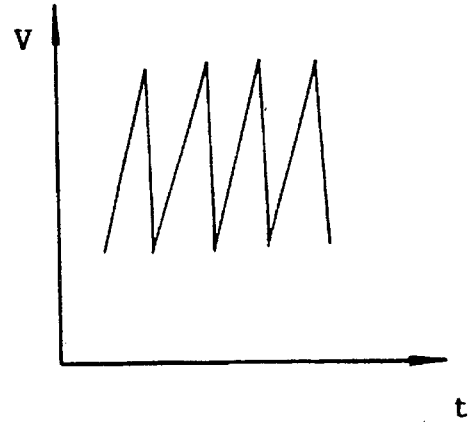

FIGS. 5(a)–(d) are exemplary views illustrating the rotative direction and the measurement of an angle in the navigation system. Specifically, FIG. 5(a) shows a reflecting mirror 9 fixedly arranged on the cylindrical reflecting plate 10 shown in FIG. 4(a) so as to allow the microcomputer to determine the rotated angle in the right or in the left direction, FIG. 5(b) shows the right and the left direction of the reflecting mirror 9 fixedly arranged on the cylindrical reflecting plate 10, FIG. 5(c) shows the waveform sensed by the first optical sensor 8 when the robot is rotated in the direction B of FIG. 5(b), and FIG. 5(d) shows the waveform sensed by the first optical sensor 8 when the robot is rotated in the direction A of FIG. 5(b).

More particularly, when the light-reflecting plate 10 is rotated, the reflecting mirror 9 will be rotated in the left or in the right direction, that is, the reflecting mirror 9 is rotated in the direction A or B as shown in FIG. 5(b). The shape and the amount of waveforms reflected from the reflecting mirror 9 will be different for the different directions. In other words, the waveform sensed by the first optical sensor, when the robot is rotated in the direction B as shown in FIG. 5(c), is different from the waveform sensed by the optical sensor 8 when the robot is rotated in the direction A as shown in FIG. 5 (d).

Accordingly, the microcomputer 50 can read the different waveforms and determine the rotated angle and the rotational direction of the robot in the left or in the right direction.

Figure 6A:
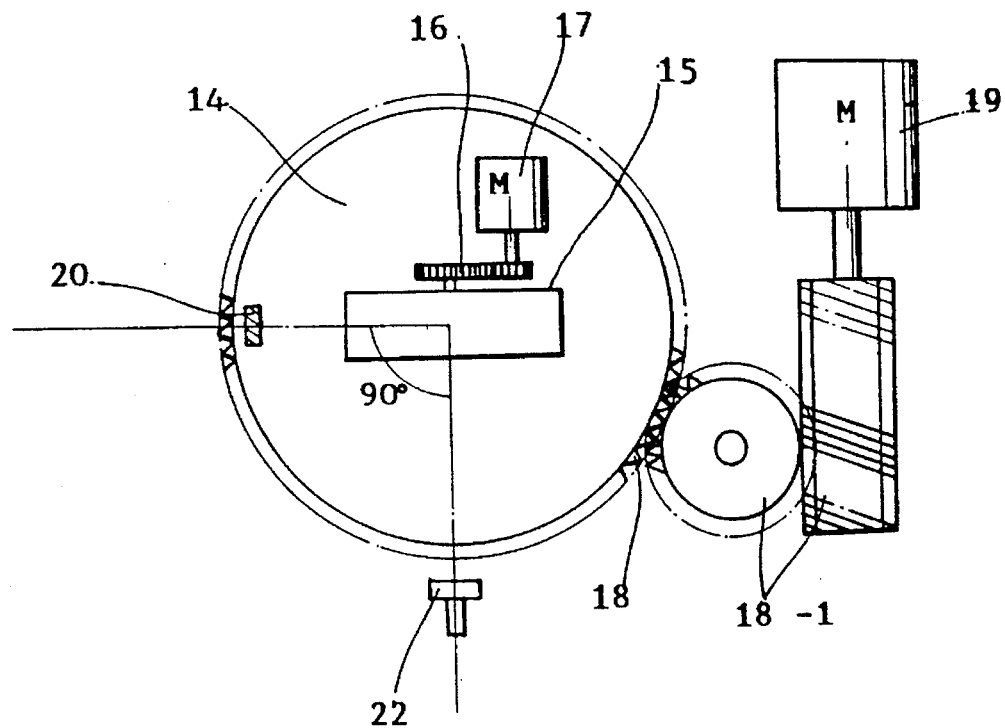
FIGS. 6(a) and (b) are views showing a construction of a driving device composing a mobile robot of the present invention.
Figure 6B:
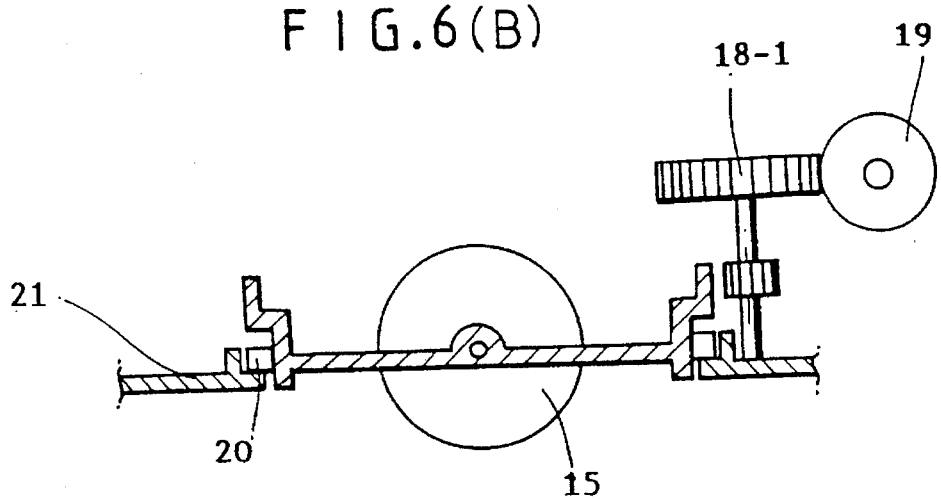

FIG. 6(a) and FIG. 6(b) show structural views of the driving device which forms the mobile robot of the present invention. A driving wheel 15 (see also FIG. 3) is mounted on the cylindrical plate 14 so that the robot 1 may be moved in proportion to the rotated number of the driving motor 17 which is connected through a plurality of gears 16 to the central axis of the driving wheel 15 and a plurality of gears 18 formed on the periphery of the cylindrical plate are merged with gears 18-1 connected to the direction control motor 19.

With this arrangement, when the cylindrical plate is correctly turned by a 90° angle according to the action of the direction control motor 19, the magnet 20 disposed on top of the cylindrical plate 14 will coincide with the magnet sensing sensor 22 on the cylindrical plate support 21, a change of direction of the robot will be completed, and the action of the direction control motor 19 will be stopped. Thereafter, the microcomputer again drives the driving motor 17 to thereby allow the robot to be moved by a constant distance. If the robot 1 rotates due to an obstacle, the navigation system 2 senses the moved angle and the microcomputer 50 determines the moved angle and compensates for that angle so as to precisely move the robot.

Figure 7A:
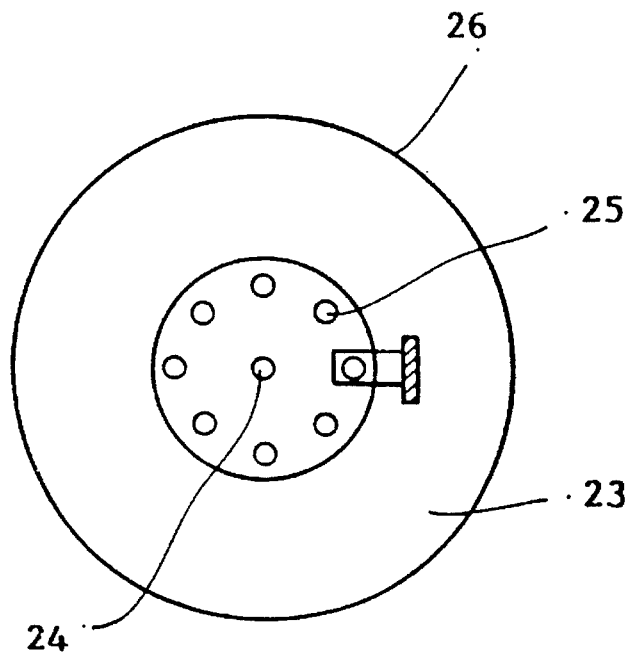
FIGS. 7(a) and (b) are structural views of a powerless wheel composing a mobile of the present invention.
Figure 7B:
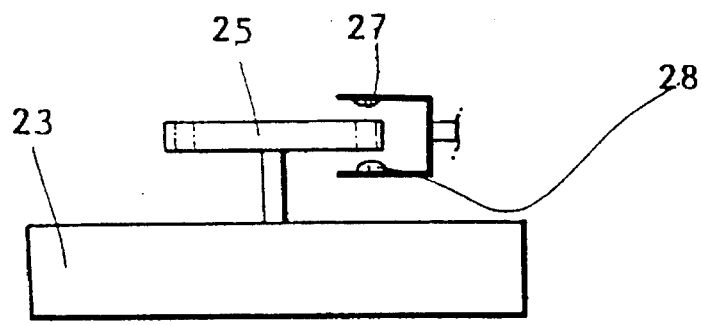

FIGS. 7(a) and (b) show structural views of the powerless wheel 23 of the mobile robot. As shown, the robot is provided with a cylindrical driving plate 26 on which a plurality of holes 25 are formed at regular intervals along the circumference. The reference numeral 24 represents a central axis of the powerless wheel. At both ends of the holes 25 are disposed the second light generating device 27 for generating a light and the second optical sensor 28 for sensing the light which is emitted from the second light generator 27 and is reflected, as shown in FIG. 7(b). With this arrangement, the number of waveforms passing through the holes 25 which are formed at one end of the central axis 24 are sensed by the second optical sensor 28 and then the sensed data are entered into the microcomputer 50 while the powerless wheel 23 is operated according to the movement of the robot 1 (that is, according to the action of the driving device). The microcomputer 50 correctly determines the moved distance of the robot 1 on the basis of the sensed data by using a previously-entered moving distance determinable program.

Figure 8:
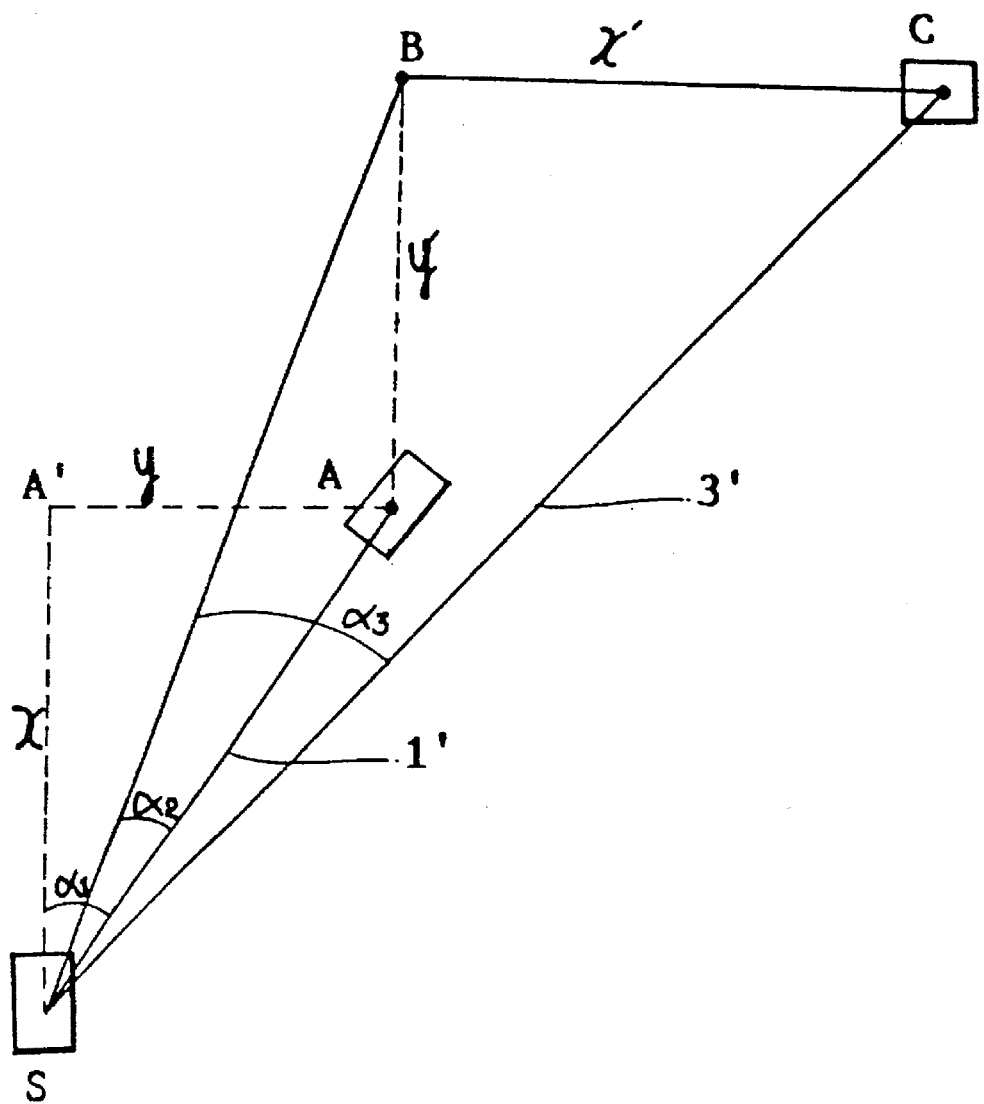
FIG. 8 is a vector view showing a method calculating the shortest return distance of a robot at the respective moved point of the mobile robot by a triangulation method.

FIG. 8 is a vector view showing the method for calculating the shortest return distance by the triangulation method at respectively moved points of the robot.

The robot 1 with the compass utilizing inertia of the present invention starts from the start points and moves toward a desired direction. If the robot is deviated from the normal orbit due to an obstacle on the moving path, the microcomputer 50 continously compensates for the moved angle by using the sensed data in the navigation system 2 to allow the robot to be correctly moved along the normal orbit and the microcomputer 50 receives the reflected light sensed by the second optical sensor 28 disposed on the powerless wheel 23. As a result, when the microcomputer 50 determines that the robot has arrived at the point A' coincident with data relative to the predetermined move distance X previously entered, the robot 50 is turned at the angle of 90° in the right or in the left direction under the control of the microcomputer 50. Herein, if the cylindrical plate 14 is accurately rotated by 90° in accordance with the operation of the direction control motor 19 in the driving device 23, the turn in the right-angled direction will be completed at a moment that the magnet 20 disposed on the top of the cylindrical plate 14 coincides with the magnetic sensor 22 on the cylindrical plate support 21. After the robot has been correctly turned by the 90° angle, the microcomputer 50 again receives data relative to the reflected light sensed by the optical sensor 28 in the same manner as described above, and controls the robot to be moved by a predetermined distance Y. If the robot reaches the point A, the microcomputer 50 determines the rotated value of the cylindrical reflecting plate 10 arranged in the navigation system 2 and computes the distance X to the point A' and the shortest return distance in the distance Y against the point A by the triangulation method with the angle $\alpha_1$. The shortest return distance is shown by 1' in FIG. 8.

Thereafter, if the robot 1 turns in direction at the point A and then moves by the distance Y' toward the point B, the microcomputer 50 calculates the shortest return distance 2' with the angle $\alpha_2$. If the robot 1 is then moved by the distance X' and reaches the point C, the microcomputer 50 calculates the shortest return distance 3', by using the angle $\alpha_3$ and stores the distance 3'. As a result, the robot may be quickly returned to the original point under the control of the microcomputer 50 based on the distance 3'.

Figure 9:
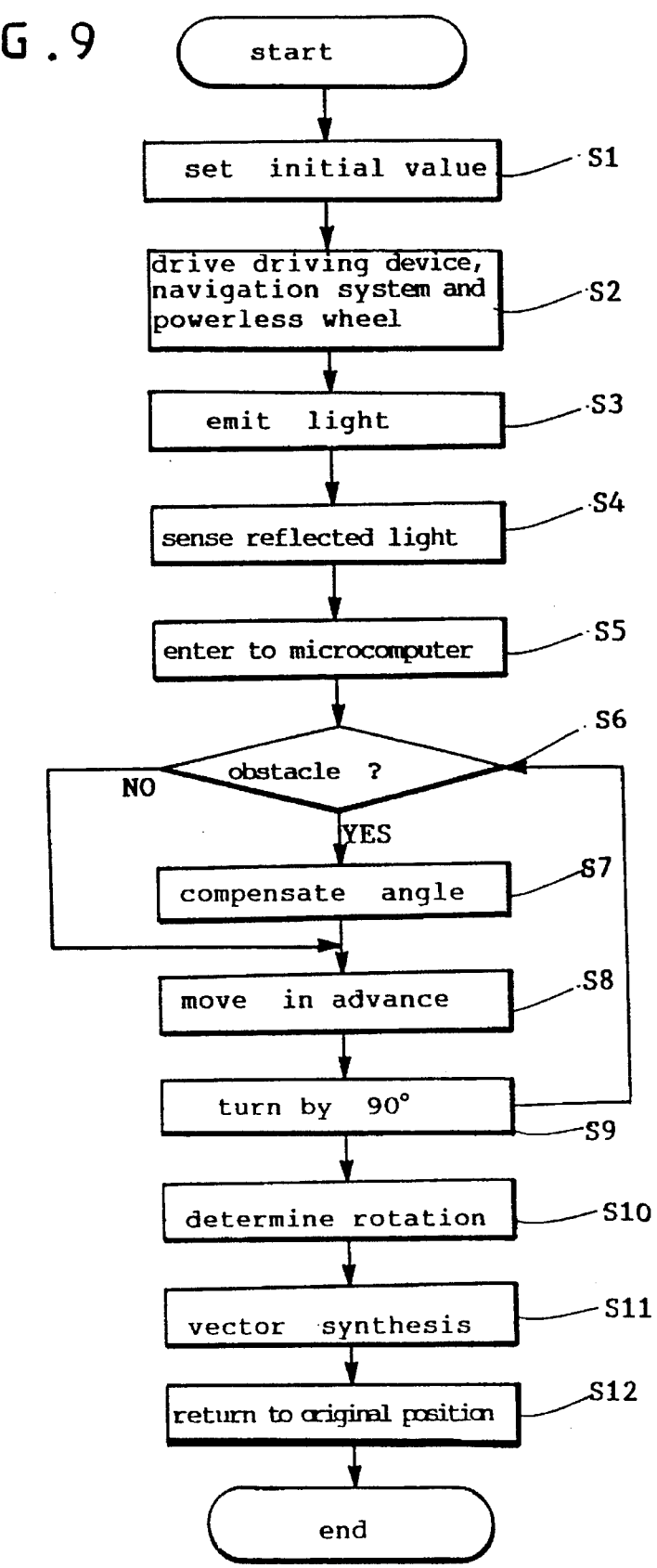
FIG. 9 is a flowchart showing an operating sequence of the present invention.

FIG. 9 is a flowchart showing the operating sequence of the present invention. First, the power voltage is supplied to the robot 1 with the navigation system using inertia of the present invention. The microcomputer 50 then sets an initial value on the basis of the initialize program at step S1 and then the microcomputer 50 drives the driving device 3, the navigation system 2 and the powerless wheel 23 at step S2. Accordingly, the driving device 3 drives the robot 1 to be moved in proportion to the rotated number of the driving motor 17 and the navigation system 2 checks whether the robot 1 is moved at the precise moving angle.

Consequently, the procedure is advanced to step S3 where the first light generator 7, which is located on the compass 6 in the navigation system 2 using inertia and operated by the microcomputer 50 at step 2, emits a light toward the advance direction of the robot so that the light is reflected from the reflecting mirror 9, and the second light generating device 27 in the powerless wheel 23 also emits a light. In fact, steps S2 and S3 are performed simultaneously.

Next, the procedure is advanced to step S4 where the first and second light sensors 8 and 28 sense the reflected lights from the reflecting mirror 9. The number of waveforms and shape information of the light sensed by the first and second optical sensors 8 and 28 are then entered into the microcomputer 50 at step S5. The procedures described above are performed repeatedly and then the procedure is advanced to step S6. At step S6, if the moved angle of the robot 1 has deviated because of the presence of an obstacle that impedes the advanced movement of the robot 1 (i.e., "yes" in step S6), the microcomputer 50 determines the erroneous movement of the robot 1 from the number of waveforms and the shape of the reflected light sensed by the first and second optical sensors 8 and 28, respectively, disposed in the navigation system 2 and from data of the powerless wheel 23 which is different from data previously stored in the microcomputer 50, and the microcomputer 50 compensates for the moved angle at step S7.

After the procedure is advanced to step S8 and the robot is moved straight by a predetermined distance previously entered in the microcomputer 50 at this step, at step S9 the microcomputer 50 determines whether or not the number of waveforms and the shape of the reflected light sensed by the second optical sensor 28 in the powerless wheel 23 coincide with data in a predetermined moving distance program previously entered therein. If the data coincides with each other, then the microcomputer 50 determines that the robot has been moved by a predetermined distance and controls the robot 1 to be turned by 90° in the right or the left direction.

This turn is performed by the direction control motor 19 in the driving device 3 and is completed if the magnet 20 on the top of the cylindrical plate 14 coincides with the magnet sensor 22 on the cylindrical plate support 21. Thereafter, the procedure is returned to step S6 and at step S6 if the data related to the reflected light are different with data entered in the microcomputer 50 due to the presence of the obstacle, the microcomputer 50 compensates for the moving angle in the same manner described above to thereby move the robot 1 in a straight path at step S8 and then turns the robot by 90° in the right or the left direction at step S9. Next, at step S10, the microcomputer 50 receives the rotated value of the cylindrical reflecting plate 10 in the navigation system in accordance with the turn of the robot 1, determines whether or not the operation is precisely performed and then measures the moving vector by using the triangulation method to calculate the shortest return distance at step S11. Accordingly, the robot 1 may be returned to the started point along the calculated shortest return distance at step S12.

On the other hand, at step S6 if the obstacle is detected on the moving path, the procedure is directly advanced to step S8 to perform operations after step S8.

It is to be understood that the invention is not limited to the precise embodiment described herein, and that various changes and modifications may be effected therein by one skilled in the art without departing from the scope of spirit of the invention as defined in the appended claims.

What is claimed is:

1. A mobile robot, comprising:

a robot body;

a plurality of wheels rotatably secured to said body;

drive means for driving one of said wheels;

turning means for turning one of said wheels to change a travel direction of said body by a predetermined angle;

inertial navigation means for detecting said predetermined angle;

means for establishing an initial start position of said robot body;

means for measuring a moved distance of said body; and control means for controlling said turning means in response to input from said inertial navigation means and for calculating a shortest return distance so as to allow said body to be returned to said initial start position along said shortest distance.

2. The mobile robot according to claim 1, wherein said turning means includes detecting means for detecting when said body has been turned 90° after said body has been moved a predetermined distance to a first point such that said robot may be moved from said first point to a second point.

3. The mobile robot of claim 2, wherein said control means calculates said shortest distance using a triangulation method based on said predetermined distance to said first point and a distance between said first and second points.

4. The mobile robot according to claim 1, wherein said inertial navigation system comprises a compass needle rotatably disposed on said body, said compass needle rotating in correspondence with the turning movement of said body; and detecting means for detecting the angular orientation of said compass.

5. The mobile robot according to claim 5, wherein said detecting means comprises:

a cylindrical reflecting plate inside of which said compass needle is positioned;

a first light generating device disposed on said compass needle for emitting a light toward said reflecting plate; and a first optical sensor disposed on said compass needle for sensing the emitted light reflected by said reflecting plate wherein the reflecting pattern of said reflecting plate is variable such that the waveform of the sensed light changes upon rotation of said compass needle.

6. The mobile robot according to claim 1 wherein said driven wheel includes a plurality of holes around the periphery thereof and wherein said measuring means includes a light emitting member and a light receiving member respectively disposed on opposite sides of said driven wheel, said light successively passing through said holes such that said light receiving member successively detects light waveforms, wherein the distance travelled by said robot is detected based on the number of waveforms detected by said measuring means.

7. The mobile robot according to claim 1, wherein said turning means comprises a disk-shaped plate fixedly connected to a steering axis of said turning wheel and second drive means for rotating said plate so as to attendantly steer said turning wheel.

8. The mobile robot according to claim 7, wherein said turning means includes means for detecting when said turning wheel has turned exactly 90°.

9. The mobile robot according to claim 8, wherein said detecting means includes a magnet provided on said disk-shaped plate and a fixed magnetic sensor disposed at a position 90° offset from the longitudinal direction of said robot.

* * * * *